United States Patent
Naoi et al.

(10) Patent No.: US 10,438,751 B2
(45) Date of Patent: Oct. 8, 2019

(54) TITANIUM OXIDE CRYSTAL BODY AND POWER STORAGE DEVICE ELECTRODE INCLUDING TITANIUM OXIDE CRYSTALLINE BODY

(71) Applicant: Nippon Chemi-Con Corporation, Shinagawa-ku, Tokyo (JP)

(72) Inventors: Katsuhiko Naoi, Tokyo (JP); Wako Naoi, Tokyo (JP); Satoru Tsumeda, Tokyo (JP); Shuichi Ishimoto, Tokyo (JP); Kenji Tamamitsu, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 31 days.

(21) Appl. No.: 15/558,843

(22) PCT Filed: Mar. 31, 2016

(86) PCT No.: PCT/JP2016/060839
§ 371 (c)(1),
(2) Date: Sep. 15, 2017

(87) PCT Pub. No.: WO2016/159323
PCT Pub. Date: Jun. 10, 2016

(65) Prior Publication Data
US 2018/0068805 A1 Mar. 8, 2018

(30) Foreign Application Priority Data
Mar. 31, 2015 (JP) .................. 2015-074267

(51) Int. Cl.
*C01G 23/04* (2006.01)
*H01M 4/485* (2010.01)
(Continued)

(52) U.S. Cl.
CPC ............. *H01G 11/46* (2013.01); *C01G 23/00* (2013.01); *C01G 23/04* (2013.01); *C25B 11/04* (2013.01);
(Continued)

(58) Field of Classification Search
None
See application file for complete search history.

(56) References Cited

U.S. PATENT DOCUMENTS

2009/0042095 A1  2/2009  Inagaki et al.
2012/0251887 A1  10/2012 Han
(Continued)

FOREIGN PATENT DOCUMENTS

CN  102496704 A  6/2012
CN  102884003 A  1/2013
(Continued)

OTHER PUBLICATIONS

International Search Report from International Patent Application No. PCT/JP2016/060839, dated Apr. 26, 2016.
(Continued)

*Primary Examiner* — Jonathan Crepeau
(74) *Attorney, Agent, or Firm* — Shapiro, Gabor and Rosenberger, PLLC (57) ABSTRACT

Provided are novel titanium oxide crystalline body and applications which do not need a conductive aid or minimize the conductive aid. A novel titanium oxide crystalline body 1 has a magneli phase 1a on a part of a surface. A titanium oxide forming a crystalline body 1 is titanium oxide represented by the general formula that is $Ti_nO_{2n}$, and a titanium oxide compound represented by the general or that is $M_\alpha Ti_\beta O_\gamma$. M indicates a metal. The magneli phase 1a is a titanium oxide represented by the general formula that is $Ti_nO_{2n-1}$ (where $3 \leq n \leq 10$). This titanium oxide crystalline (Continued)

body 1 also has the characteristics of the magneli phase 1a without deteriorating the characteristics of base material that is the titanium oxide.

11 Claims, 10 Drawing Sheets

(51) Int. Cl.
- *H01G 11/46* (2013.01)
- *C25B 11/04* (2006.01)
- *H01G 9/20* (2006.01)
- *H01G 11/30* (2013.01)
- *H01G 11/50* (2013.01)
- *H01M 4/36* (2006.01)
- *H01M 4/48* (2010.01)
- *C01G 23/00* (2006.01)

(52) U.S. Cl.
CPC ............ *H01G 9/20* (2013.01); *H01G 11/30* (2013.01); *H01G 11/50* (2013.01); *H01M 4/36* (2013.01); *H01M 4/48* (2013.01); *H01M 4/485* (2013.01); *C01P 2002/90* (2013.01); *C01P 2004/24* (2013.01); *H01G 9/2031* (2013.01); *Y02E 10/542* (2013.01); *Y02E 60/122* (2013.01)

(56) References Cited

U.S. PATENT DOCUMENTS

| | | |
|---|---|---|
| 2013/0115516 A1 | 5/2013 | Naoi et al. |
| 2014/0363568 A1 | 12/2014 | Suematsu et al. |
| 2015/0255790 A1 | 9/2015 | Naoi et al. |
| 2015/0263337 A1 | 9/2015 | Naoi et al. |
| 2017/0346090 A1 | 11/2017 | Hanawa et al. |

FOREIGN PATENT DOCUMENTS

| | | |
|---|---|---|
| EP | 3 236 481 A1 | 10/2017 |
| JP | 2004-322045 A | 11/2004 |
| JP | 2005-332684 A | 12/2005 |
| JP | 2009-043679 A | 2/2009 |
| JP | 2011-236061 A | 11/2011 |
| JP | 2012-006816 A | 1/2012 |
| JP | 2012-169217 A | 9/2012 |
| JP | 2012-214373 A | 11/2012 |
| JP | 2013-073854 A | 4/2013 |
| JP | 2014-086164 A | 5/2014 |
| WO | WO 2007/028972 A1 | 3/2007 |
| WO | WO 2014/034933 A1 | 3/2014 |

OTHER PUBLICATIONS

Extended European Search Report dated Sep. 27, 2018, in European Patent Application No. 16773203.1.

Office Action dated Nov. 12, 2018, in Chinese Patent Application No. 201680016719.1.

Naoi, Katsuhiko, "New hybrid supercapacitors and their prospects", Carbon Society of Japan, Jan. 15, 2013, No. 256, p. 22-32.

Office Action dated May 15, 2018, in Japanese Patent Application No. 2017-510237.

Xu Xiaohui, "Production Technology of Salt Chemical Industry," Central Radio & Television University Press Co., Ltd., Jan. 321, 2014, p. 208.

Office Action dated Jul. 30, 2019, in Chinese Patent Application No. 201680016719.1.

| Ti-O DISTANCE OF Ti4O7 | 1.854 | 1.934 | 1.993 | 2.024 | 2.063 | 2.156 |
|---|---|---|---|---|---|---|
| Ti-O DISTANCE OF FINAL RESULTANT PRODUCT | 1.713 | 1.873 | 1.991 | | 2.053 | 2.317 |
| DIFFERENCE | −0.141 | −0.061 | −0.002 | +0.029 | +0.068 | +0.161 |

TITANIUM OXIDE CRYSTAL BODY AND POWER STORAGE DEVICE ELECTRODE INCLUDING TITANIUM OXIDE CRYSTALLINE BODY

TECHNICAL FIELD

The present disclosure relates to a titanium oxide crystalline body.

BACKGROUND ART

Titanium oxides, such as titanium oxide represented by the general formula of $Ti_nO_{2n}$ and lithium titanium oxide represented by the general formula of $Li_\alpha Ti_\beta O_\gamma$ are expected to be used in various applications due to the characteristics of titanium oxides.

For example, titanium oxide (IV) is expected to be used in applications, such as the electrode of a dye-sensitized solar cell, a storage battery that can be charged with light, an photoelectrode for hydrogen production by water decomposition, a pigment a coloring agent, a photocatalyst, an antibacterial material, water treatment technologies, and cancer treatment. Lithium titanate is expected to be used in applications like an electrode active material for power storage devices, such as storage batteries and capacitors.

However, these titanium oxides have disadvantages, such as poor electrical conductivity and absorption property capable of absorbing ultraviolet rays only. Hence, researches on complexes which have both the characteristics of titanium oxide and those of other substances, and which compensate the disadvantages of titanium oxide are being advanced.

For example, many researches have been made on the use of carbon having high electrical conductivity as a conductive aid for titanium oxide or lithium titanate (see, for example, Patent Document 1). Such researches are particularly active for power storage devices, such as lithium ion secondary batteries using metal compound particles for the positive electrode and the negative electrode, respectively, and lithium ion capacitors using active carbon for the positive electrode and using a material (e.g., graphene, and metal compounds) capable of reversibly adsorbing and desorbing lithium ions for the negative electrode. These power storage devices are applied as power supplies for information devices, such as mobile phones and laptop computers, and also applied for regenerative energy applications in vehicles, etc.

CITATION LIST

Patent Literatures

Patent Document 1: JP 2012-169217 A

SUMMARY OF INVENTION

Technical Problem

However, although the rate characteristics are improved by applying a conductive aid like carbon, the charging and discharging characteristics at a high rate are not sufficient yet. In addition, when the conductive aid like carbon is applied, this results in a technical problem such that energy density decreases.

Hence, an objective of the present disclosure is to provide novel titanium oxide crystalline body, production method thereof, and applications which are capable of improving the rate characteristics, and which do not need a conductive aid or minimize the conductive aid.

Solution to Problem

In order to accomplish the above objective, a novel titanium oxide crystalline body according to the present disclosure includes a magneli phase on a part of a crystalline surface of a titanium oxide. Accordingly, the titanium oxide achieves a high electric conductivity without deteriorating the characteristics of the titanium oxide. This is because, unlike the state in which the magneli phase is embedded inside, the magneli phase is present on the surface, and thus an electron path including the magneli phase may be formed on the surface of the titanium oxide crystalline body.

The titanium oxide may be lithium titanate represented by a general formula of $Li_\alpha Ti_\beta O_\gamma$. The titanium oxide may be spinel type lithium titanate represented by $Li_4Ti_5O_{12}$. In addition, the magneli phase may be a titanium oxide product represented by a general formula of $Ti_mO_{2n-1}$, where $3 \le n \le 10$. The magneli phase may be $Ti_4O_7$. $Ti_4O_7$ has the electrical conductivity that is 2.75 times as much as that of carbon.

The titanium oxide crystalline body may be formed in a flat plate shape, and have the magneli phase on an edge surface of a facet surface. In addition, the titanium oxide crystalline body may have a length of equal to or greater than 5 and equal to or shorter than 100 nm.

Advantageous Effects of Invention

The titanium oxide crystalline body according to the present disclosure has an electron path including the magneli phase and formed on the surface, and thus no conductive aid is required or the conductive aid is minimized, which is suitable for the electrode of a power storage device, the electrode of a dye-sensitized solar cell, a storage battery that can be charged with light, and a photoelectrode electrode for hydrogen production by water decomposition.

DESCRIPTION OF EMBODIMENTS (Titanium Oxide Crystalline body Structure)

Figure 1:
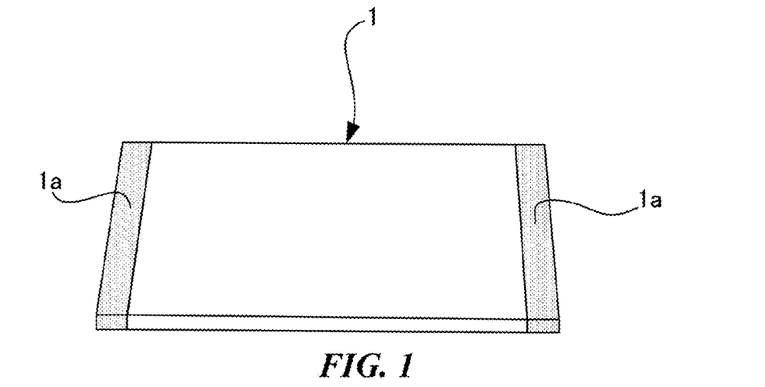
FIG. 1 is a conceptual diagram illustrating a novel titanium oxide crystalline body.

As illustrated in FIG. 1, a novel titanium oxide crystalline body 1 (hereinafter, simply referred to as a crystalline body 1) according to the present disclosure has a magneli phase 1a on a part of the surface of a crystalline body 1 of a titanium oxide. The crystalline body 1 is the largest collection that can be regarded as a single crystal of titanium oxide before the part of the surface is transformed to the magneli phase 1a. The crystalline body 1 has a flat plate shape of a triangular shape, a rectangular shape or other polygonal shapes, a polyhedron shape having a thickness, or a shape defined by a spherical shape, an ellipsoidal shape, or other curved surfaces. The crystalline body 1 desirably has an average size of 5 to 100 nm, a thickness of equal to or less than 1 nm in the level of 2 to 5 atomic layers when in a flat plate shape, and a side of the two-dimensional surface spreading to 5 to 100 nm.

The surface of the crystalline body 1 is an edge surface when the crystalline body 1 is a flat plate or a polyhedron, and is a side portion or an end portion of the facet surface. One or more of the side portions or the end portions of the crystalline body 1 are transformed into the magneli phase 1a. A part of the entire length of the side portion or the end portion of the crystalline body 1 or the entire length thereof is the magneli phase 1a. The magneli phase 1a may be contained in a part of the facet surface. In addition, the surface of the crystalline body 1 is a single or multiple partial regions of the surface when the crystalline body 1 is formed with a curved surface.

The titanium oxide product constituting the crystalline body 1 is titanium oxide represented by the general formula of $Ti_nO_{2n}$, and titanium oxide compound represented by the general formula of $M_\alpha Ti_\beta O_\gamma$. The symbol M is a metal. Example titanium oxide compounds are lithium titanate, lead titanate, barium titanate, lead zirconate titanate, potassium titanate, vanadium titanate, strontium titanate, calcium titanate, magnesium titanate, and aluminum titanate. Titanium oxide is an anatase type or rutile type titanium oxide (IV) represented by, for example, $TiO_2$. The titanium oxide compound is, for example, spinel type lithium titanate represented by, for example, $Li_{4+w}Ti_5O_{12}$ ($0 \leq w \leq 3$) or a ramsdellite type lithium titanate represented by $Li_{2+y}Ti_3O_7$ ($0 \leq y \leq 3$).

The magneli phase 1a is a titanium oxide represented by the general formula of $Ti_nO_{2n-1}$ ($3 \leq n \leq 10$). This magneli phase 1a is, for example, $Ti_4O_7$, a mixed phase of $Ti_4O_7$ with $Ti_5O_9$, or a mixed phase of an elementary substance or equal to or greater than two substances selected from compounds represented by the general formula of $Ti_nO_{2n-1}$ ($3 \leq n \leq 10$).

When the base material of the titanium oxide crystalline body 1 is lithium titanate, this titanium oxide crystalline body has both the characteristics of lithium titanate and the characteristics of the magneli phase 1a. Lithium titanate has an energy storage function by insertion and desorption of lithium ions. Since the volume change by insertion and desorption is substantially 1%, capacity deterioration is little. Since the charging and discharging potential is substantially 1.5 V (vs Li/Li+), side reactions, such as decomposition of an electrolytic solution and precipitation of lithium metal due to rapid charging and discharging hardly occur, and thus the cycle characteristics are excellent. When the crystalline body 1 is lithium titanate, this crystalline body has an advantage as an active material of such an electrode.

However, lithium titanate has the lower electrical conductivity than that of carbon. Conversely, the magneli phase 1a has a high electrical conductivity, and for example, $Ti_4O_7$ has the electrical conductivity that is 2.75 times as much as that of carbon. That is, this titanium oxide crystalline body 1 has the characteristics to which the high electrical conductivity is given by the magneli phase 1a while maintaining the performance of the active material as lithium titanate. Hence, this titanium oxide crystalline body 1 is suitable for, e.g., the electrode of a power storage device, the electrode of a dye-sensitized solar cell, a storage battery that can be charged with light, and a photoelectrode for hydrogen production by water decomposition.

(Production Method of Titanium Oxide Crystalline Body)

The titanium oxide crystalline body 1 can be obtained by performing a heating process on a complex titanium oxide and carbon under an oxygen atmosphere. Carbon is burned out from the complex by the heat process on the complex under the oxygen atmosphere, the surface of the crystalline body is transformed into the magneli phase 1a, and thus the titanium oxide crystalline body 1 is produced.

In this heating process, carbon is combined with oxygen in the atmosphere, and is burned. In addition, although not limited to this mechanism, carbon is converted to carbon monoxide Co or carbon dioxide $CO_2$ by desorbing oxygen atoms of titanium oxide from the bonding interface and titanium is reduced, and lithium is gasified to $Li_2O$ by taking out the oxygen atoms from the titanium oxide. By these reactions, oxygen desorption occurs until Ti:O becomes n:2n+2 to n:2n−1, lithium is gasified, and lithium titanate constituting the surface of the crystalline body 1 is transformed into the magneli phase 1a.

Hence, in this heat process, the bonding degree of carbon and titanium oxide, the oxygen concentration, the burning temperature and the burning time may be determined based on the size of the titanium oxide crystalline body 1, the degree of carbon removal, the transformation to the magneli phase 1a by the above reaction, and the transformation ratio.

That is, in this heat process, it is preferable to set the heat process temperature within the range from equal to or higher than 400 to equal to or lower than 600° C. In addition, it is preferable to maintain the heat process time from equal to or longer than 0.5 to equal to or shorter than 10 hours. At a temperature lower than 400° C., and a heat process time of less than 0.5 hours, removal of carbon becomes insufficient, and thus a decrease in energy density becomes remarkable. Still further, the temperature lower than 400° C. and the heat process time of less than 0.5 hours may not facilitate a transformation to the magneli phase 1a, and the satisfactory high electrical conductivity is not given to the crystalline body 1 of titanium oxide.

In the heat process at the temperature exceeding 600° C. and exceeding 10 hours, aggregation of the crystalline body 1 progresses. In addition, in the heat process at the temperature exceeding 600° C. and exceeding 10 hours, the transformation to the magneli phase 1a excessively proceeds, and even the high electrical characteristics are given, the characteristics of titanium oxide may be deteriorated. Still further, in the crystalline body 1 obtained by setting such a temperature range and such a time as described above, an average size is maintained at 5 to 100 nm, and particle growth from the average size of the crystalline body of titanium oxide before the heat process is suppressed.

Note that as for the oxygen atmosphere, a mixed atmosphere with nitrogen, etc., is also applicable, and an atmosphere in which equal to or greater than 15% of oxygen, etc., is present like the atmosphere is preferable. In the heating process under the oxygen atmosphere, since the amount of oxygen is decreased by the burning of carbon, oxygen may be appropriately supplied into a heating process furnace so as not to disturb oxygen desorption.

The complex of titanium oxide with carbon can be obtained through, for example, a process of mixing a material source of titanium oxide with a carbon source, and a heating process on the mixture under an inert atmosphere. When the process starts from the formation of such a complex, in general, the titanium oxide crystalline body 1 can be obtained through the mixing process of the material source of titanium oxide with the carbon source, a first heating process on the mixture under the inert atmosphere, and a second heating process under an oxygen atmosphere on the mixture having undergone the first heating process. Materials burning out like carbon, and causing oxygen desorption or lithium desorption in addition to oxygen desorption may be combined with titanium oxide instead of carbon.

When the crystalline body 1 is to be constituted by lithium titanate, in the mixing process, a formation of a precursor of lithium titanate, and composition of the precursor of lithium titanate with the carbon source are progressed by composition schemes, such as mechanochemical process, spray dry process, or stirring process. The precursor of lithium titanate is $Ti_\beta O_\gamma$ or the constituent compound thereof. $Ti_\beta O_\gamma$ or the constituent compound thereof may follow the stoichiometric proportion of titanium oxide, and for example, in the case of lithium titanate that is $Li_4Ti_5O_{12}$, it is appropriate if the atom ratio of Ti and O becomes 5:12. In the mixing process, a titanium source, such as titanium oxide or titanium alkoxide which can be the precursor of lithium titanate, is applied into a solvent together with the carbon source.

When the crystalline body 1 is constituted by titanium oxide, in the mixing process, composition of titanium oxide with the carbon source is progressed by composition schemes, such as mechanochemical process, spray dry process, or stirring process. In the mixing process, together with the carbon source, titanium oxide itself is applied into the solvent.

The carbon source means carbon (powders) itself or a material that becomes carbon by heating process. As for carbon (powders), any carbon material having conductivity can be applied without a particular limitation. For example, carbon black, such as Ketjen black, acetylene black and channel black, fullerene, carbon nanotube, carbon nanofiber, amorphous carbon, carbon fiber, natural graphite, artificial graphite, graphitized Ketjen black, mesoporous carbon, and vapor phase method carbon fiber are applicable. Among those materials, a carbon material having a particle diameter in nano size is preferable.

A material that becomes carbon by the heating process is an organic substance which is deposited on the surface of the source material of the crystalline body 1, and is converted into carbon by a later heating process. Example organic substances are polyalcohol (e.g., ethylene glycol), polymer (polyvinyl alcohol, polyethylene glycol, polyvinyl pyrrolidone, etc.), sugar (glucose, etc.), and amino acid (glutamic acid etc.).

The mixing ratio of carbon is preferably within the range between 95:5 and 30:70 in ratio by weight of the titanium oxide crystalline body 1 and carbon. Within this range, pores and spaces in the aggregate of the titanium oxide crystalline body 1 obtained eventually can be increased. In addition, adjustment of the mixing ratio enables an adjustment of the size of the titanium oxide crystalline body 1 to be within the range between 5 to 100 nm.

The solvent is not limited to any particular one as long as it does not give an adverse effect to the reactions, and water, methanol, ethanol, isopropyl alcohol, etc., can be suitably applied. Equal to or greater than two kinds of solvents may be mixed and applied.

In mechanochemical process, shear stress and centrifugal force are applied to the solution in a rotating reactor. As a reactor, a reactor, as described in FIG. 1 of JP 2007-160151 A, which consists a concentric cylinder including an outer tube and an inner tube, in which through-holes are provided in a side surface of the rotatable inner tube, and a sheathing board is disposed at an opening of the outer tube, is suitably applicable. In this reactor, the distance between the outer wall of the inner tube and the inner wall of the outer tube should be preferably equal to or smaller than 5 mm, and more preferably, equal to or smaller than 2.5 mm. The necessary centrifugal force for forming a thin film is equal to or greater than 1500 N(kgms$^2$), preferably, equal to or greater than 70000 N (kgms$^2$).

Using titanium alkoxide Ti (OR) x as a starting material, when the precursor of lithium titanate is produced by hydrolysis reaction, a reaction inhibitor may be added to the solution. By adding a predetermined compound which forms a complex with titanium alkoxide as the reaction inhibitor, an excessive advance of chemical reaction is suppressed. The reaction is suppressed and controlled by adding, to titanium alkoxide, the predetermined compound like acetic acid that forms a complex with titanium alkoxide in an amount of 1 to 3 mol per 1 mol of the titanium alkoxide to form a complex. Example materials capable of forming a complex with titanium alkoxide are, in addition to acetic acid, carboxylic acid, such as citric acid, oxalic acid, formic acid, lactic acid, tartaric acid, fumaric acid, succinic acid, propionic acid, and replic acid, aminopoly carboxylic acid like EDTA, and complexing agents represented by amino alcohol.

In the spray dry process, first, carbon powders are preferably dispersed in the solvent. As for a dispersing scheme, carbon powders are preferably highly dispersed in the solvent by ultracentrifugation (a process applying shear stress and centrifugal force to the powders in the solution), bead mill, homogenizer, etc. A solution obtained by dissolving the material source of titanium oxide in the solvent in which the carbon powders are dispersed is sprayed and dried on a substrate. The spray dry process is performed at a temperature that does not burn out the carbon powders at a pressure of substantially 0.1 Mpa. When the material source of titanium oxide is titanium alkoxide, titanium alkoxide is oxidized to form the precursor of lithium titanate and the precursor of lithium titanate is composited with the carbon powders.

As for the stirring process, the solution is stirred. The powders are preferably pulverized in advance to form nano-level microscopic particles. When polymer is applied as the material that becomes carbon by heating process, a material source of titanium oxide is added to a solvent to which the polymer is added beforehand, and this solution may be stirred. The polymer is preferably adjusted to be within the range between 0.05 to 5 when the weight of the powders as the material source of the titanium oxide product is defined as 1.

It is expected that the precursor of lithium titanate or titanium oxide adsorbs to the carbon source by intermolecular chemical bond, such as ionic bond, metalic bond, hydrogen bond, and van der waals bond, through the above mixing process.

In the first heating process after the mixing process, lithium titanate is formed and crystal of titanium oxide grows on carbon. In the mixing process, when a titanium source is put in, the lithium source is added before this heating process. Example lithium sources are lithium acetate, lithium nitrate, lithium oxide, lithium carbonate, and lithium hydroxide. The lithium source and the titanium source may follow the stoichiometric proportion of lithium titanate, and for example, in the case of lithium titanate that is $Li_4Ti_5O_{12}$, the titanium source and the lithium source may be added to the solvent in such a way that the atomic ratio of Li to Ti becomes 4:5. In the mixing process, in addition to the titanium source, the lithium source may be put in beforehand.

In this first heating process, the complex obtained in the mixing process is subjected to the heating process under the vacuum or inert atmosphere, such as nitrogen or argon atmospheres. In the heating process under the inert atmosphere, the precursor of lithium titanate is melted and lithium is absorbed, and thus titanium oxide is produced and crystal thereof grows, or titanium oxide is crystallized. The carbon source is carbonized and becomes carbon. The bonding interfaces of carbon and the titanium oxideare subjected to lattice junction by the growth of titanium oxide on carbon. In addition, in this heating process, by processing under the inert atmosphere, burning of carbon that desorbs oxygen atoms from titanium oxidet in the later second heating process is prevented.

In this heating process, the temperature is maintained within the range between 600 and 950° C. for 1 to 20 minutes under the inert atmosphere in order to prevent the carbon source from being burned out. When, in particular, the titanium oxide is lithium titanate, and when the heating process temperature is lower than 600° C., formation of lithium titanate is insufficient which is not preferable, and when the heating process temperature exceeds 950° C., lithium titanate is clumped and the lithium titanate itself is decomposed which is also not preferable. Heating process under a nitrogen atmosphere is particularly preferable as the inert atmosphere, and nitrogen is doped in titanium oxide crystalline body 1 to increase the conductivity.

Prior to the first heating process under this inert atmosphere, preliminary heating process may be performed which maintains the complex having undergone the mixing process at a temperature range between 200 and 500° C. and for 1 to 300 minutes. Depending on the complex obtained by this preliminary heating process, impurities present in the complex can be removed, and a state in which the precursor of titanium oxide is uniformly attached on the carbon source can be achieved. In addition, there is also an effect of promoting the formation of the precursor of titanium oxide.

EXAMPLES

Hereinafter, an example of the present disclosure will be given, but the present disclosure is not limited to the example. First, as a first example, the mixing process was performed initially. 20 g of Carbon nanofiber and 245 g of tetraisopropoxy titanium were added to 1300 g of isopropyl alcohol to dissolve tetraisopropoxy titanium in isopropyl alcohol. The weight ratio of titanium alkoxide and carbon nanofiber was selected to be the weight ratio of lithium titanate and carbon nanofiber after the first heating process became substantially 8:2. The obtained liquid was introduced into an inner tube of a reactor that was a concentric cylinder including an outer tube and the inner tube, in which a through holes are provided in the side surface of the inner tube, and a sheathing board is disposed at an opening of the outer tube, the inner tube was rotated for 300 seconds so as to apply centrifugal force of 35000 $kgms^{-2}$ to the liquid, and thus carbon nanofiber was highly dispersed in the liquid.

165 g of Acetic acid and 50 g of lithium acetate were dissolved in a mixed solvent of 145 g of isopropyl alcohol and 150 g of water. The obtained liquid was introduced into the inner tube of the above reactor to prepare the solution. The inner tube was rotated for 300 seconds so as to apply centrifugal force of 35000 $kgms^{-2}$ to this solution to form a thin film of the solution on the inner wall of the outer tube, and shear stress and centrifugal force were applied to the solution.

Next, the first heating process was performed. The contents of the reactor were collected, the solvent was evaporated in air, and further dried at 100° C. for 1.7 hours. The resultant product obtained by drying was subjected to the preliminary heating process at 400° C. for 30 minutes in nitrogen, and then heating process at 900° C. for 3 minutes in nitrogen.

Further, the second heating was performed. 100 g of the resultant product obtained by the heating process under the nitrogen atmosphere was subjected to the heating process at 500° C. for 6 hours to obtain a final resultant product.

Figure 2:
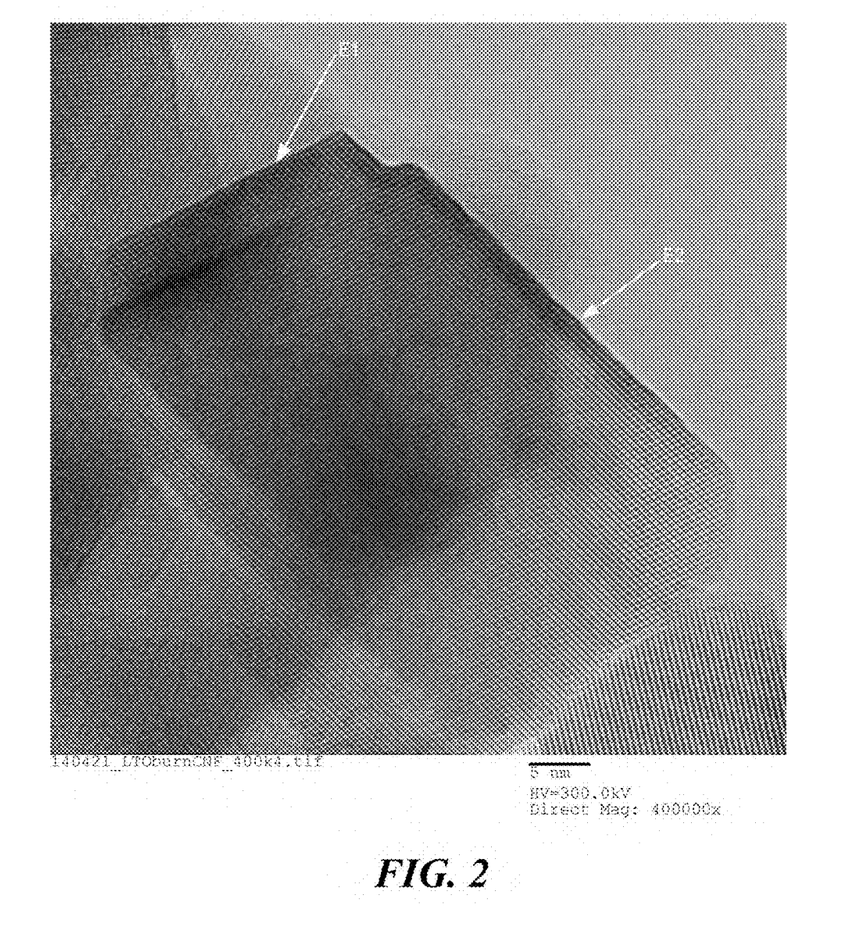
FIG. 2 is an HRTEM image focusing on the titanium oxide crystalline body according to an example, and the magnification is 400000 times.

Next, structural analysis on the final resultant product was performed. First, images of the final resultant product were taken by a scanning electron microscope, and the structure was analyzed. FIG. 2 is an HRTEM image focusing on the primary particle portion of the final resultant product by a high resolution transmission electron microscope, and the magnification was 400000 times. As illustrated in FIG. 2, the primary particles have a thin-piece shape, and the lattice is clear. That is, it becomes apparent that this primary particle is a crystalline body.

In additions, edges E1 and E2 of the two sides are darkened entirely relative to the pinacoid of the crystalline body, and it becomes apparent that a crystal of substances for pinacoid of the crystalline body is different from that for edge of the crystalline body.

Figure 3:
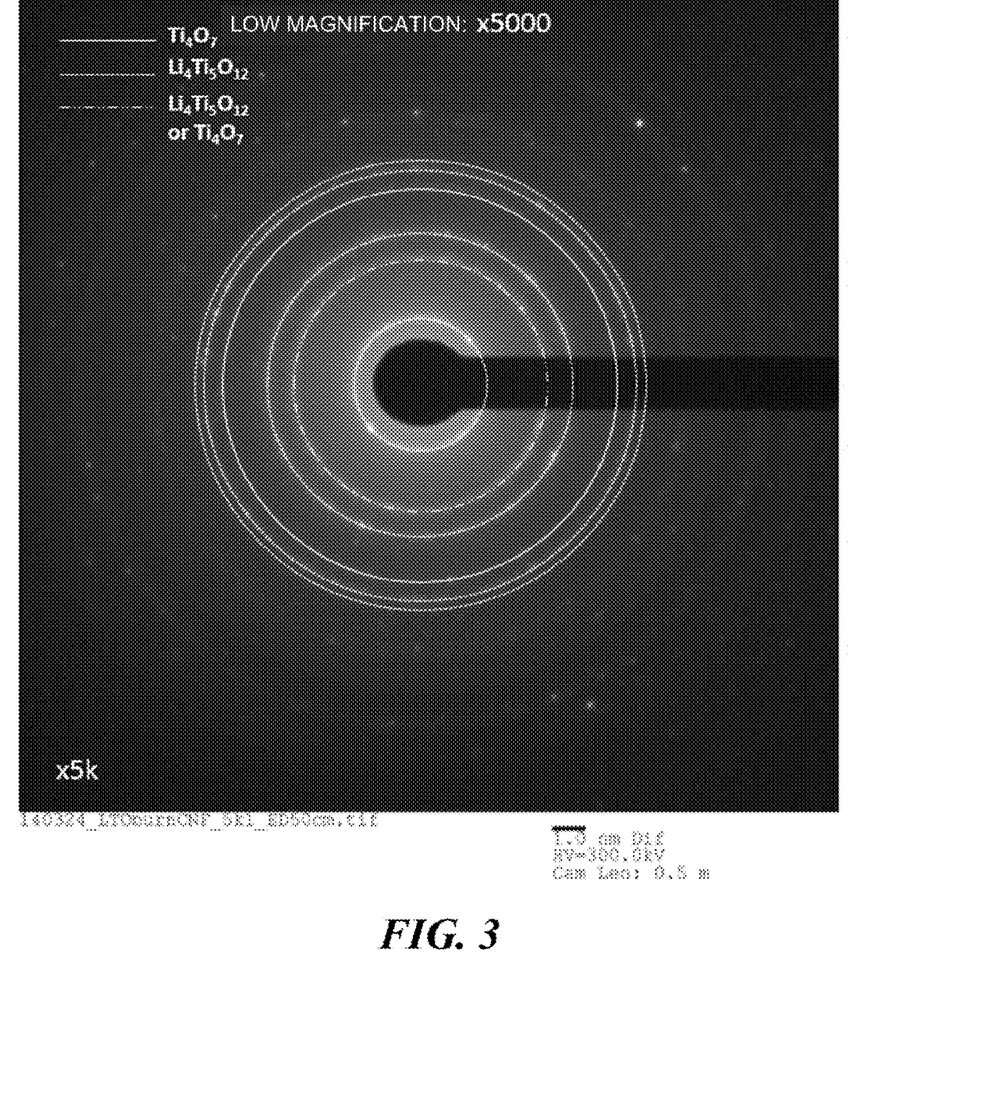
FIG. 3 is a selected area ED diagram at a low magnification of the titanium oxide crystalline body according to the example, and the low magnification is 5000 times.
Figure 4:
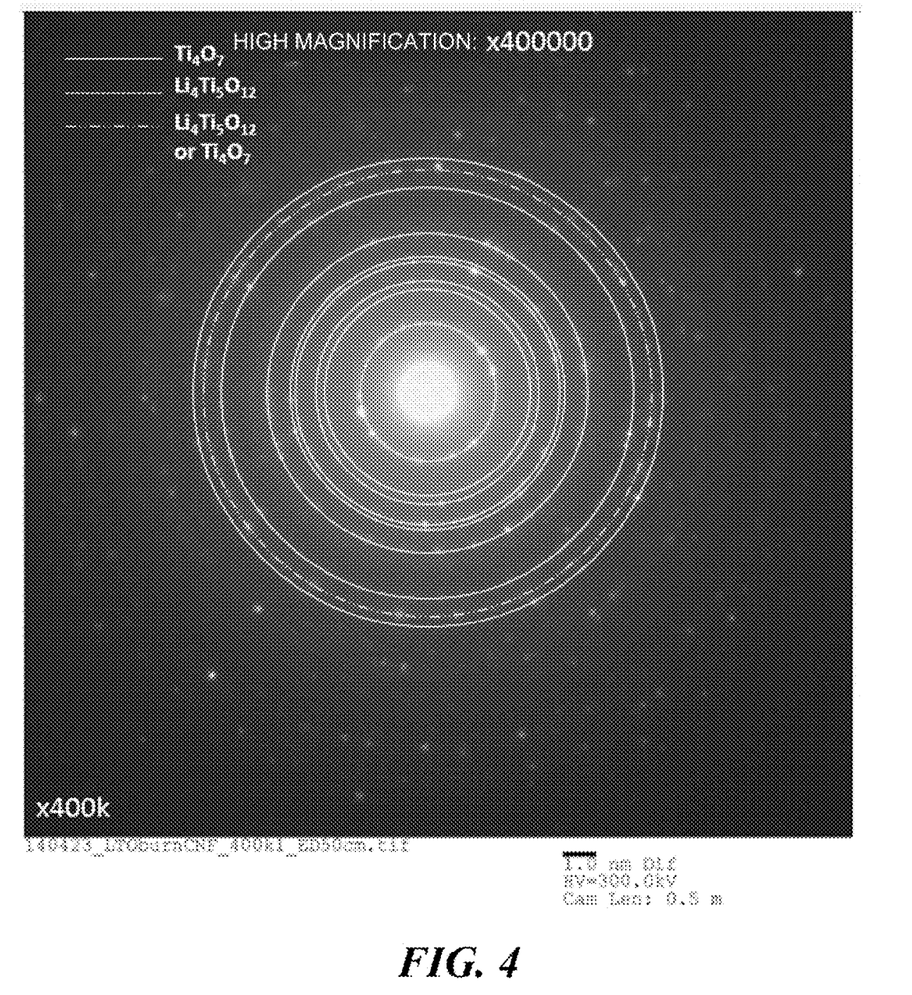
FIG. 4 is a selected area ED diagram at a high magnification of the titanium oxide crystalline body according to the example, and the high magnification is 400000 times.

Next, in order to identify the substance of the pinacoid of the crystalline body and that of the edge, the final resultant product was studied by a selected area electron diffraction scheme. FIG. 3 is a selected area ED diagram at a low magnification of the final resultant product, and the low magnification is 5000 times. FIG. 4 is a selected area ED diagram at a high magnification of the final resultant product, and the high magnification is 400000 times. In view of actual measured values based on the diffraction pattern illustrated in FIG. 3 at the low magnification that is 5000 times and the results obtained by converting the actual measured values into surface spacing d value (A), and actual measured values based on the diffraction pattern at the high magnification that is 400000 times illustrated in FIG. 4 and the results obtained by converting the actual measured values into the surface spacing d value (A), most of the crystalline bodies are formed of lithium titanate, but when observed at the high magnification, it becomes apparent that there is a high possibility that a large amount of $Ti_4O_7$ is contained.

Thirdly, by X-ray absorption spectroscopy (XAS) measurement using SPring-8, substances forming the facet surface of the crystalline body and the edge thereof were further identified. In the XAS measurement, bulk information on the interior of the crystalline body and surface information thereof were separately measured. As for the bulk information, the Ti K-edge XAS transmission scheme (SPring-8) was applied, and as for the surface information, Ti K-edge XAS conversion electron yield scheme (SPring-8) was applied. The same measurements were performed on $Li_4Ti_5O_{12}$ that was a commercially-available product (available from Toho Titania) as a standard sample.

Figure 5:
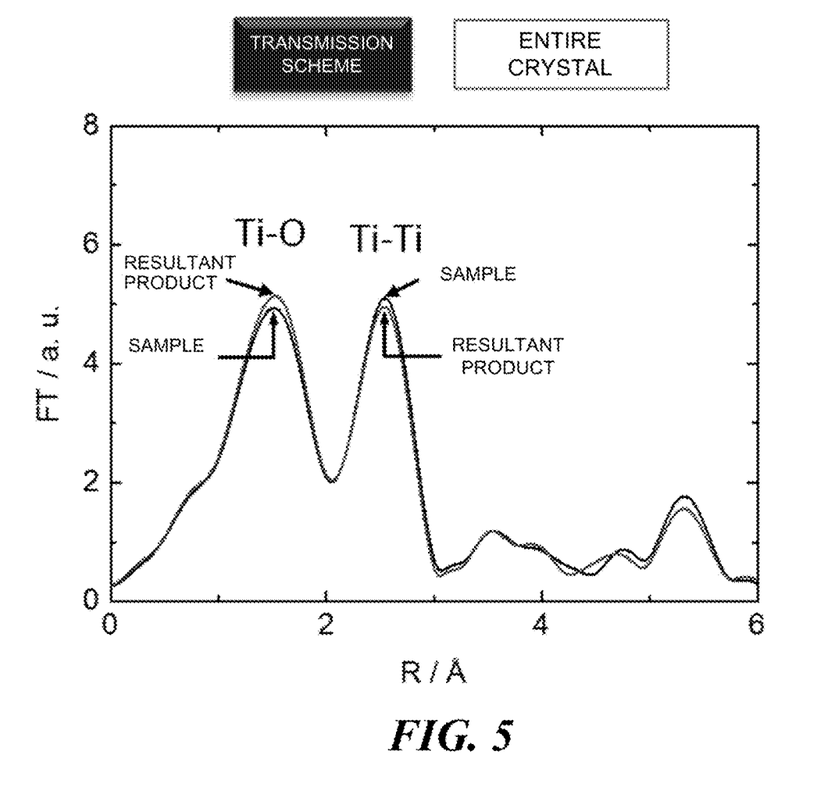
FIG. 5 is a graph illustrating the results of a transmission scheme by Ti K-edge EXAFS with respect to the titanium oxide crystalline body according to the example.

FIG. 5 is a graph illustrating the results of a transmission scheme by Ti K-edge EXAFS. Ti K-edge EXAFS determines the local structure around Ti. A difference between the final resultant product and the standard sample by the transmission scheme was hardly observed. That is, it is apparent that, as for the crystalline body as a whole, Ti-O bonding and Ti-Ti bonding are common to the standard sample and the final resultant product, and the crystalline body of the final resultant product as a whole is formed of $Li_4Ti_5O_{12}$.

Figure 6:
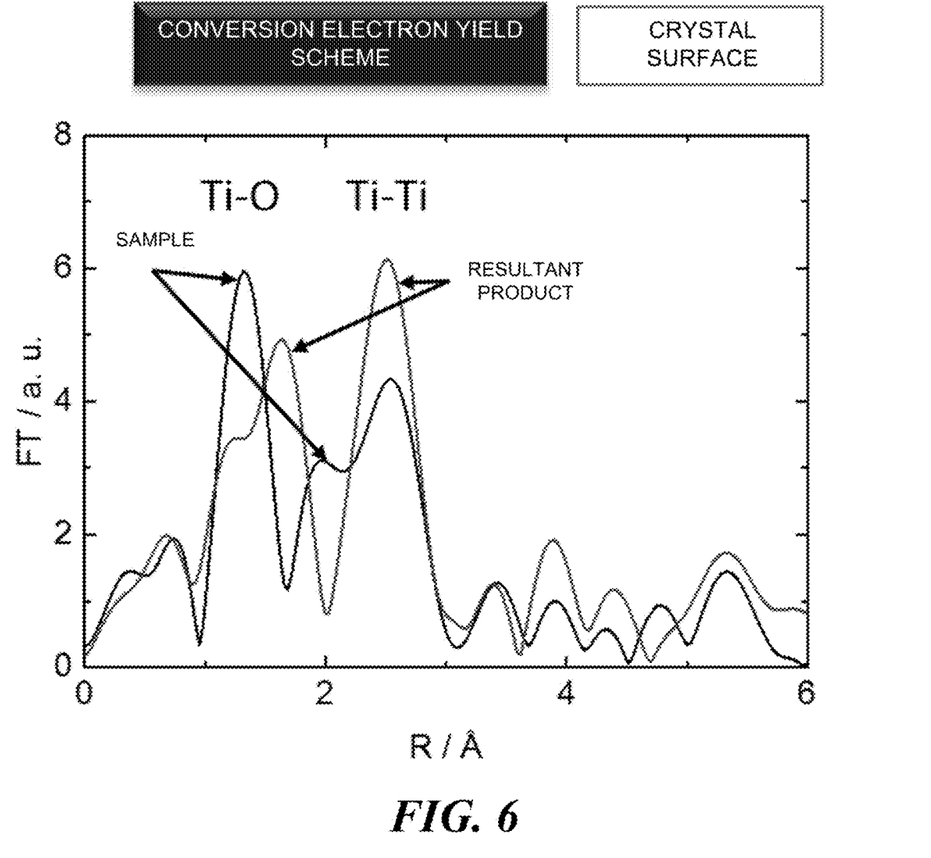
FIG. 6 is a graph illustrating the results of a conversion electron yield scheme by Ti K-edge EXAFS with respect to the titanium oxide crystalline body according to the example.

Conversely, FIG. 6 is a graph illustrating the results by a conversion electron yield scheme by Ti K-edge EXAFS. As illustrated in FIG. 6, as for the Ti-Ti bonding, the standard sample and the final resultant product were consistent, but a change in the Ti-O bonding was observed in the crystalline body of the final resultant product. That is, it is apparent that the state of the Ti-O bonding changes on the surface of the crystalline body of the final resultant product.

Figure 7:
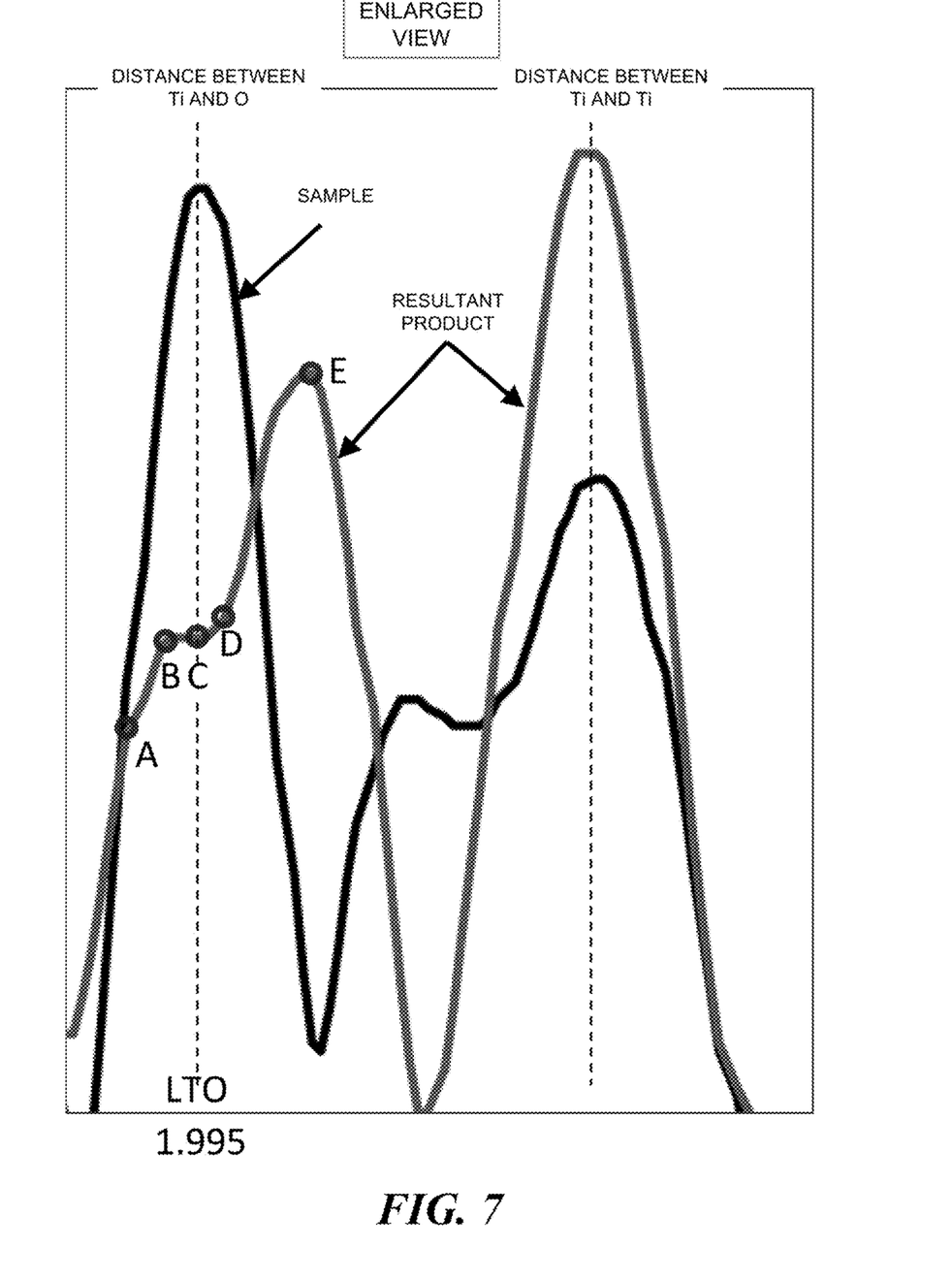
FIG. 7 is an enlarged view of a graph illustrating the results of the conversion electron yield scheme by Ti K-edge EXAFS with respect to the titanium oxide crystalline body according to the example.

FIG. 7 is an enlarged view of FIG. 6. As illustrated in FIG. 7, it becomes apparent that there are five peaks in the distance (Å) between Ti and O. A distance between Ti and O of a peak A is 1.713, a distance between Ti and O of a peak B is 1.873, a distance between Ti and O of a peak C is 1.991, a distance between Ti and O of a peak D is 2.053, and a distance between Ti and O of a peak E is 2.317.

Figure 8:
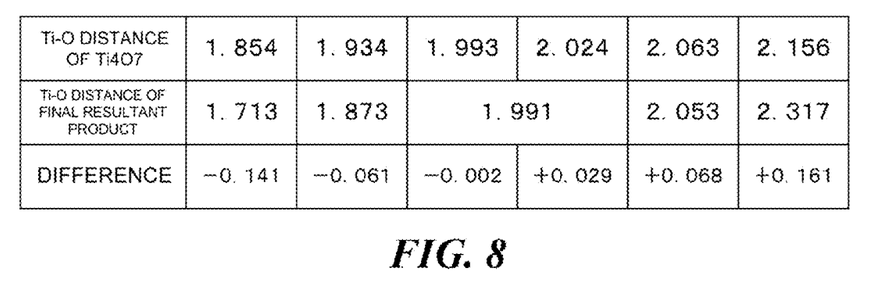
FIG. 8 is a table illustrating a comparison on each peak obtained by the conversion electron yield scheme by Ti K-edge EXAFS with a distance between Ti and O of $Ti_4O_7$.

A comparison of each peak obtained by the conversion electron yield scheme by Ti K-edge EXAFS with the distance between Ti and O of $Ti_4O_7$ is illustrated in FIG. 8. Since spinel type $Li_4Ti_5O_{12}$ employs a structure in which regular octahedrons overlap, the distance between Ti and O is 1.995 only. $TiO_2$ of rutile and anatase is similar to $Li_4Ti_5O_{12}$. It is known that $Ti_4O_7$ employs a complicated structure and the distance between Ti and O has peaks at 1.854, 1.934, 1.993, 2.024, 2.063, and 2.156. Comparing the results of the peaks A to F with the distances between Ti and O of $Ti_4O_7$, it becomes apparent that the crystalline body surface of the final resultant product is quite similar to $Ti_4O_7$ in the number of peaks and the peak value.

In view of the above, it becomes apparent that the crystalline body of the final resultant product is formed of $Li_4Ti_5O_{12}$ as a whole, but the surface of the crystalline body is transformed into $Ti_4O_7$. Summarizing the results in FIG. 2 to FIG. 7, it is confirmed that the final resultant product is the titanium oxide crystalline body 1 that has the edge surface of the crystalline body of $Li_4Ti_5O_{12}$ transformed into $Ti_4O_7$ and the crystalline bodies 1 are coupled in sequence in the card house structure to form the secondary particle.

(Evaluation on Example)
(Carbon Remaining Amount)

In the second heating process, the heating process was performed at 500° C. for 6 hours according to the first example, whereas, according to a second example, 100 g of the collected material was subjected to the heating process at 350° C. for 3 hours, and according to a third example, 100 g of the collected material was subjected to the heating process at 300° C. for 1 hour. Other conditions were the same in the first to third examples.

Next, the carbon remaining amount was measured for the lithium titanate crystalline body 1 obtained in the first example, the second example, and the third example. As for the measurement, TG-DTA measurement (differential thermal-thermogravimetric simultaneous measurement) was applied. The results of shelf test on those examples at 60° C. are indicated in table 1. As for the shelf test, each capacitor that was charged at 2.8 V was held for 30 minutes, and then left in an atmosphere at 60° C., for 1500 hours. The discharging capacity when this capacitor was charged and discharged again was calculated as the rate relative to the discharging capacity prior to the test.

In the shelf test, 5 wt % of polyvinylidene fluoride and an appropriate amount of N-methyl -pyrrolidone were added to the titanium oxide crystalline body 1 of the first example, the second example, and the third example and sufficiently kneaded and mixed to form a slurry, the slurry was applied on an aluminum foil, and dried to obtain an electrode. In addition, using the obtained electrode, a laminate-sealed capacitor was produced with 1 M of $LiBF_4$ propylene carbonate solution as an electrolytic solution, and an activated carbon electrode as an opposing electrode.

TABLE 1

| | Carbon Remaining Amount | Shelf Test |
| --- | --- | --- |
| First Example | Equal to or less than 1% | 83% |
| Second Example | 3% | 72% |
| Third Example | 5% | 66% |

As indicated in table 1, the carbon remaining amount less than 5 wt % is preferable, and in particular, the first example in which the carbon remaining amount that was equal to or less than 1 wt % accomplishes a good result.

(Capacitor Evaluation)

As a first conventional example, 87 g of titanium oxide ($TiO_2$) pulverized so as to be a nano size (substantially 200 nm) was added to an aqueous solution containing 38 g of lithium hydroxide and 800 g of water, and the aueous solution was stirred to obtain a solution. This solution was introduced to a spray dry apparatus and spray-dried to obtain a dried product. The obtained dried granulated product was heated in air at a temperature of 700° C. for 3 hours to obtain granules of lithium titanate. Since the granules were carbon free, it is assumed that there was no bonding between carbon and lithium by the heating process, and there was no oxygen desorption by the gasification of each of carbon and lithium, and the magneli phase was not formed. In addition, since carbon was not present during the production process, there was no space where carbon was removed.

5 wt. % of polyvinylidene fluoride and an appropriate amount of N-methyl-pyrrolidone were added to the titanium oxide crystalline body of the first example and the granule products of lithium titanate of the first conventional example, and sufficiently kneaded and mixed to form a slurry, and the slurry was applied on an aluminum foil, and dried to obtain an electrode. In addition, using the obtained electrode, a laminate-sealed capacitor was produced with 1 M of LiBF$_4$ propylene carbonate solution as an electrolytic solution and an activated carbon electrode as an opposing electrode.

Figure 9:
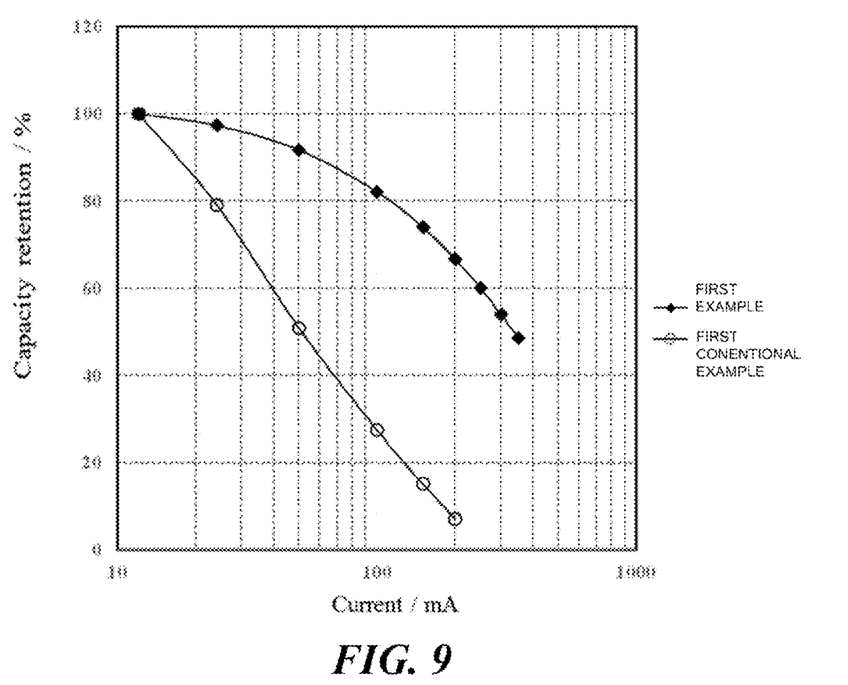
FIG. 9 is a diagram illustrating a relationship between a rate and a capacity maintaining ratio for a capacitor of a first example and that of first conventional example.

FIG. 9 is a graph illustrating a relationship between the rate and the capacity retention rate for the obtained capacitors according to the first example and the first conventional example. As is apparent from FIG. 9, the capacitor according to the first example can obtain the good rate characteristic even at a high rate. In particular, according to the capacitor of the first example, the good rate characteristics are obtained although the electrode does not contain conductive carbon as a conductive aid. For example, at 200° C., the capacitor according to the first conventional example has a capacity retention rate that is less than 10%, whereas the capacitor according to the first example has the capacity retention rate reaching substantially 70%.

(Conductivity Evaluation)

Figure 10:
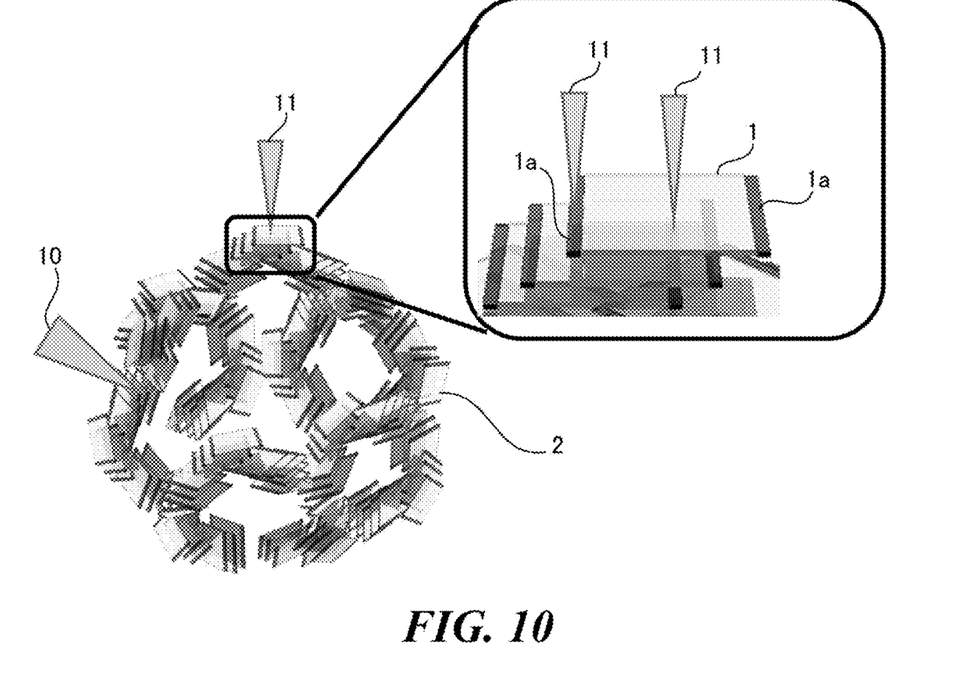
FIG. 10 is a schematic diagram illustrating a probe contact position in a conductivity test on the titanium oxide crystalline body according to the example.

The conductivity of the titanium oxide crystalline body 1 of the first example was evaluated. As illustrated in FIG. 10, according to the first example, multiple titanium oxide crystalline bodies 1 are coupled in sequence in a card house structure to form a secondary particle 2. One titanium oxide crystalline body 1 was selected from the secondary particles 2, and in order to apply a voltage to the titanium oxide crystalline body 1, a probe 11 was caused to be in contact with the titanium oxide crystalline body 1, and at the different portion of the secondary particle 2, the other probe 10 was caused to be in contact with. That is, the titanium oxide crystalline bodies 1 in contact with the probe 10 and the probe 11 were different from each other, and were apart from each other. As for the voltage application, a microdevice characteristic evaluation apparatus (N-6000 SS available from Hitachi High-Technologies Corporation) was applied.

Figure 11A:
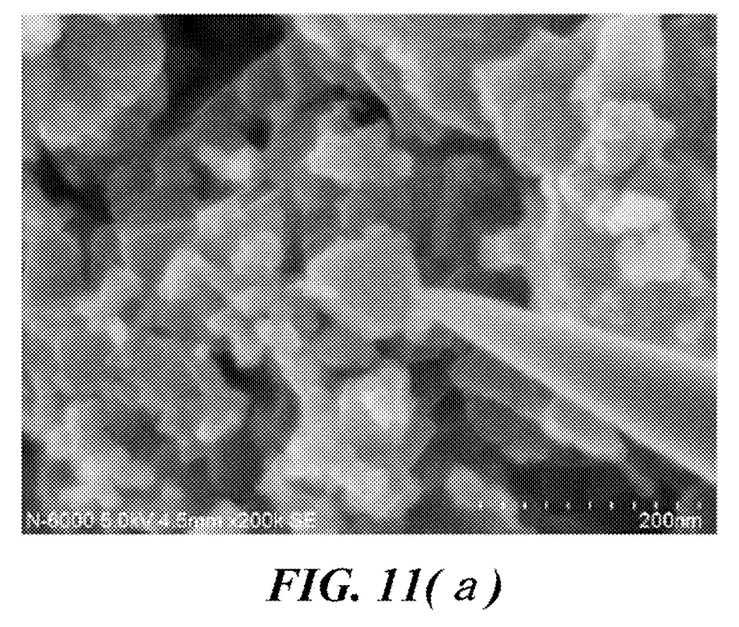
FIG. 11(a) is a photograph illustrating a state in which a probe is in contact with an end portion formed by a magneli phase.
Figure 11B:
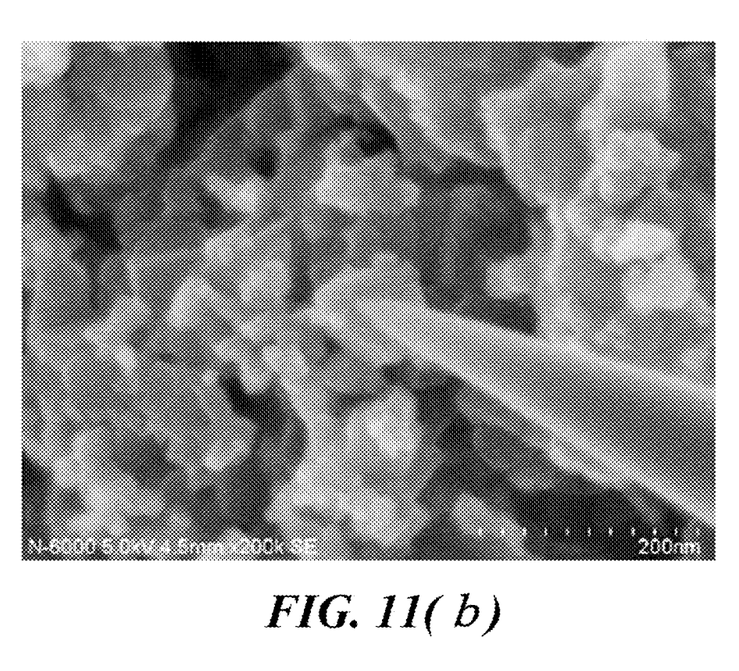
FIG. 11(b) is a photograph illustrating a state in which the probe is in contact with a central portion formed by lithium titanate.

The contact portion of the probe 10 was fixed. On the other hand, as illustrated in FIGS. 11(a) and (b), with respect to the selected titanium oxide crystalline body 1, the probe 11 was caused to be in contact with the magneli phase 1a which was present at the end portion and which was formed of Ti$_4$O$_7$, to perform the conductivity evaluation test, and by changing the contacting portion to lithium titanate formed of Li$_4$Ti$_5$O$_{12}$ present at the center, the conductivity evaluation test was performed.

Figure 12:
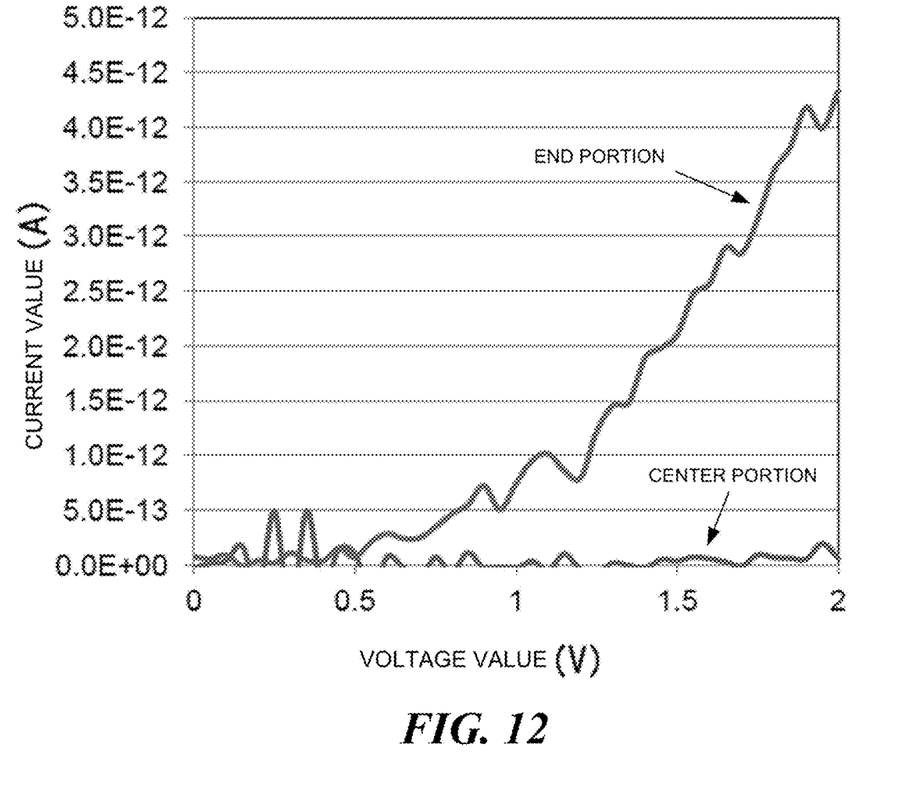
FIG. 12 is a graph illustrating the results of a conductivity test on the titanium oxide crystalline body according to the example.

FIG. 12 illustrates the results of the conductivity test, and is a graph having the horizontal axis that represents the voltage and the vertical axis that represents the current. As is apparent from FIG. 12, when the probe 11 was caused to be in contact with the magneli phase 1a, a high current value was measured. In the titanium oxide powders mixed with carbon as a conductive aid, there was a boundary resistance between carbon and the crystalline body. On the other hand, from this result, it is apparent that the crystalline body 1 behaves as if it were integrated with an electrode terminal each formed of the magneli phase 1a.

REFERENCE SIGNS LIST

1 Titanium oxide crystalline body
1a Magneli phase

The invention claimed is:

1. A titanium oxide crystalline body formed in a flat plate shape and comprising a magneli phase on an edge surface of a facet surface of the titanium oxide crystalline body.

2. The titanium oxide crystalline body according to claim 1, wherein the titanium oxide is lithium titanate represented by a general formula of Li$_\alpha$Ti$_\beta$O$_y$.

3. The titanium oxide crystalline body according to claim 2, wherein the titanium oxide is spinel type lithium titanate represented by Li$_4$Ti$_5$O$_{12}$.

4. The titanium oxide crystalline body according to claim 1, wherein the magneli phase is a titanium oxide represented by a general formula of Ti$_n$O$_{2n-1}$, where $3 \leq n \leq 10$.

5. The titanium oxide crystalline body according to claim 4, wherein the magneli phase is Ti$_4$O$_7$.

6. The titanium oxide crystalline body according to claim 1, having a length of equal to or greater than 5 and equal to or shorter than 100 nm.

7. An electrode for a power storage device comprising the titanium oxide crystalline body according to claim 1.

8. The titanium oxide crystalline body according to claim 2, wherein the magneli phase is a titanium oxide represented by a general formula of Ti$_n$O$_{2n-1}$, where $3 \leq n \leq 10$.

9. The titanium oxide crystalline body according to claim 2, wherein the magneli phase is Ti$_4$O$_7$.

10. An electrode for a power storage device comprising the titanium oxide crystalline body according to claim 2.

11. An electrode for a power storage device comprising the titanium oxide crystalline body according to claim 4.

* * * * *